(12) United States Patent
Burnette et al.

(10) Patent No.: US 7,590,234 B2
(45) Date of Patent: Sep. 15, 2009

(54) KEYPAD WITH FLANGED KEYS FOR HIGH AUDIO FRONT PORTING COMMUNICATION PRODUCTS

(75) Inventors: Donald W. Burnette, Sunrise, FL (US); Julio C. Castaneda, Coral Springs, FL (US); Jason D. McIntosh, Weston, FL (US); William H. Robertson, Jr., Fort Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 698 days.

(21) Appl. No.: 11/283,337

(22) Filed: Nov. 18, 2005

(65) Prior Publication Data

US 2007/0120826 A1 May 31, 2007

(51) Int. Cl.
*H04M 1/00* (2006.01)
*H04M 9/00* (2006.01)

(52) U.S. Cl. ................ 379/433.07; 455/550.1

(58) Field of Classification Search ............ 379/433.01, 379/433.06, 433.07, 368; 345/169; 200/341, 200/512; 455/550.1
See application file for complete search history.

(56) References Cited

U.S. PATENT DOCUMENTS

| 4,081,631 | A | 3/1978 | Feder |
| 5,265,274 | A | 11/1993 | Knutson et al. |
| 5,721,787 | A | 2/1998 | Neibaur et al. |
| 6,108,416 | A | 8/2000 | Collin et al. |

*Primary Examiner*—Tuan D Nguyen
(74) *Attorney, Agent, or Firm*—Akerman Senterfitt; Pablo Meles

(57) ABSTRACT

The embodiments of the invention concern a keypad (120). The keypad can include a membrane (143), at least one key with at least one flange 150 to overlap with at least one second flange of a second key (146), and at least one audio port opening (107) in the membrane for providing a passage of air from a transducer (101) positioned behind at least one key through the keypad to a main volume area (112). For example, the audio port opening can be in a region of the membrane between the keys, and the overlapping of the flanges obscures a view of at least one audio port opening.

18 Claims, 2 Drawing Sheets

KEYPAD WITH FLANGED KEYS FOR HIGH AUDIO FRONT PORTING COMMUNICATION PRODUCTS

FIELD OF THE INVENTION

This invention relates generally to a transducer arrangement design, and more particularly to a transducer audio porting arrangement to channel audio through a keypad.

BACKGROUND OF THE INVENTION

The cellular phone industry is constantly challenged in the market place for high audio quality, low-cost products. Motorola's iDEN technology has traditionally reached a fleet service workforce creating a demand for high audio speakerphones. The high audio speakerphones allow a user to engage in a voice conversation without having to hold the phone to the ear. Further, with the demand to make products smaller and with more features, speakerphone designs have started to include the high-audio speaker (transducer) within the mechanical housing of the phone to decrease product size. The transducer is positioned behind the keys to project audio through the keypad.

Many phones have silicone keypads with discrete keys that project upwards between the openings of a plastic housing grill. The rubber keys can be a continuous part of a silicone membrane which serves as the keypad. The housing grill can be a part of the mechanical casing of the phone. The housing grill can include a cross-section of plastic strips over the keypad area that have a minimal width specified by the strength of the plastic, or material. The rubber keys which have height are aligned apart from one another creating a trough that allows for the placement of the housing grill. The plastic strips rest within the channels of the keypad thereby separating the keys.

Ports are generally drilled or cut through the keypad to allow air to flow through the housing grill openings for passing sound. The ports are placed at locations on the keypad which are covered, or hidden, by the housing grill. For example, holes are created behind the plastic strips of the housing grill such that an opening is created to allow air to flow from the speaker through the rubber keypad and up through the ports under the plastic strips and then between the openings of the housing grill. The ports are positioned below the plastic strips of the housing grill such that a user cannot see the openings, i.e. the user only sees the housing grill which covers the openings, and not the hole openings below the plastic cross strips.

Recently, zero-gap keypads have been introduced for use with cell phones to make keypads smaller in line with demand for smaller products. The zero-gap keypads have minimal space between the keys. The keys are abutted next to one another with minimal gap between them. However, a slight gap exists to avoid the physical friction between keys as a user depresses a key. Unlike the regular silicone keypads which have space between the keys, the zero-gap keypads have no room to allow the plastic cross-section strips of a housing grill. In practice, this makes zero-gap keypads attractive because they require less material, are more compact, and provide similar function to normal keypads. Accordingly, zero-gap keypads generally lack a housing grill over the keypad to cover the space between the keys. The zero-gap keys are also interconnected by a silicone membrane which can be seen on fine inspection of the keypad.

The zero-gap keypad has a continuous membrane like the regular rubber keypads. High audio ports cut at positions on the membrane between the keys, to allow high audio to pass, will be seen by the user, particularly during lighted dialing. The zero-gap keys, even though considered zero-gap, have finite space between the keys, and the silicone membrane can be seen through the zero gap spaces. For example, port openings positioned between the zero-gap keys can be seen when the light reflects off the port openings during lighted keypad mode. Additionally, the keys on a zero-gap keypad are generally vertical without overhang, and do not allow ports to be drilled under the keys.

SUMMARY OF THE INVENTION

The present embodiment of the invention concerns a keypad with flanged keys. The keypad can include a membrane, at least one key on the membrane with at least one flange, and at least one audio port opening in the membrane for providing a passage of air flow from a transducer positioned behind the keypad through the keypad to a front region where a user is situated. In one arrangement, at least one flange of a first key overlaps with a second key to obscure a view of at least one audio port opening in the membrane. At least two keys can also be arranged with zero-gap distances between them. One flange of a first key can overlap with at least one flanged overhang of a second key to obscure the view of an audio port opening.

In one arrangement, a zero-gap keypad design is provided. The zero-gap keypad design can include a membrane for supporting at least one zero-gap key with a clover shaped under-hang flange, eight zero-gap keys having flanged overhangs positioned circumferential to the center zero-gap key for overlapping with the clover shaped flange of the center zero-gap key, and four audio port openings in the membrane for providing a passage of air from a transducer positioned behind the overlapping zero-pad keys through the zero-gap keypad and membrane to a front region.

In another arrangement a transducer stacking design is provided. The transducer stacking design can include a transducer assembly for producing a sound, a circuit board having at least one audio port forming a main passage for the sound to pass, and a keypad with at least one flanged key providing a pathway for the passage of the sound to escape through the keypad for producing a main volume. The circuit board can partially enclose a frontal area of the transducer, and the keypad can overlay the circuit board. The audio port and the flanged key can provide an audio channel for the passage of the sound from the transducer for producing the main volume. The at least one flanged key can cover at least one audio port opening to be hidden from view. The keypad or transducer stacking design can be part of a portable electronic product such as a portable two-way radio, a cellular phone, a laptop computer, a cordless phone, a personal digital assistant or a portable radio receiver to name a few examples.

DETAILED DESCRIPTION OF THE DRAWINGS

Figure 1:
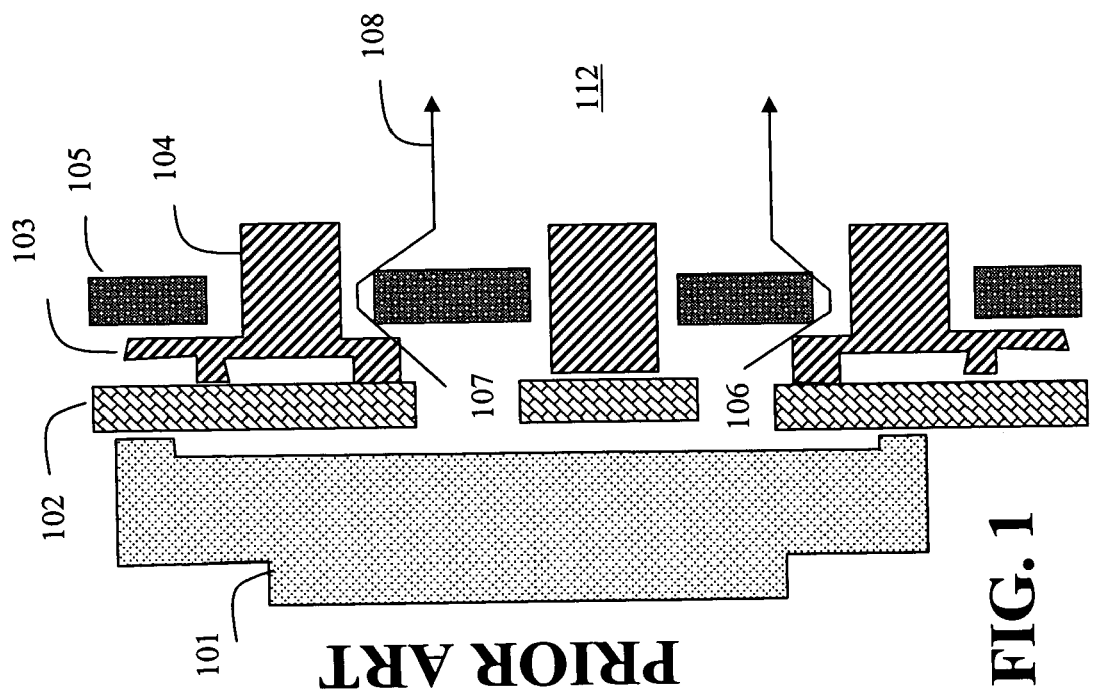
FIG. 1 is a side view of an existing transducer high audio porting design.

Referring to FIG. 1, a cross section of an existing transducer stacking design 100 illustrates the conventional keypad and transducer arrangement. The transducer design 100 can include a transducer 101, a circuit board 102, a membrane 103 with keys 104, and a housing grill 105. The membrane 103 and keys 104 can be together considered the keypad 103. For reference, FIG. 1 is a centered and vertical cross-section of an existing transducer design. The transducer design 100 can include at least one frontal volume area 107 that is anterior to the speaker 101 and posterior to the keypad 103. A second volume area 106 is shown for illustration. The frontal volume area 107 supports a region of air which propagates as an acoustic wave 108 toward the user when the transducer 101 is active, i.e., playing audio. The frontal volume area 107 can be created by cutting out a portion of the circuit board 102 and the keypad 103. The cutout portion produces an audio port 107, i.e. a hole or vent. The audio port 107 can be covered by the housing grill 105 such that it is not visible from the perspective of the main volume area 112. The transducer 101 can also move air from behind the transducer 101 around to the frontal volume area 107. The user can hear the sound emanating from the transducer 101 at the main volume region 112. The housing grill 105 can block the acoustic wave 108 generated by the transducer from reaching the main volume area 112. Accordingly, the acoustic wave 108 can travel through the frontal volume area 107 around the housing grill 105 between the keys 104 of the keypad 103 to reach the user. The housing grill 105 blocks view of the audio ports cutout in the circuit board 102 and keypad 103.

Figure 2:
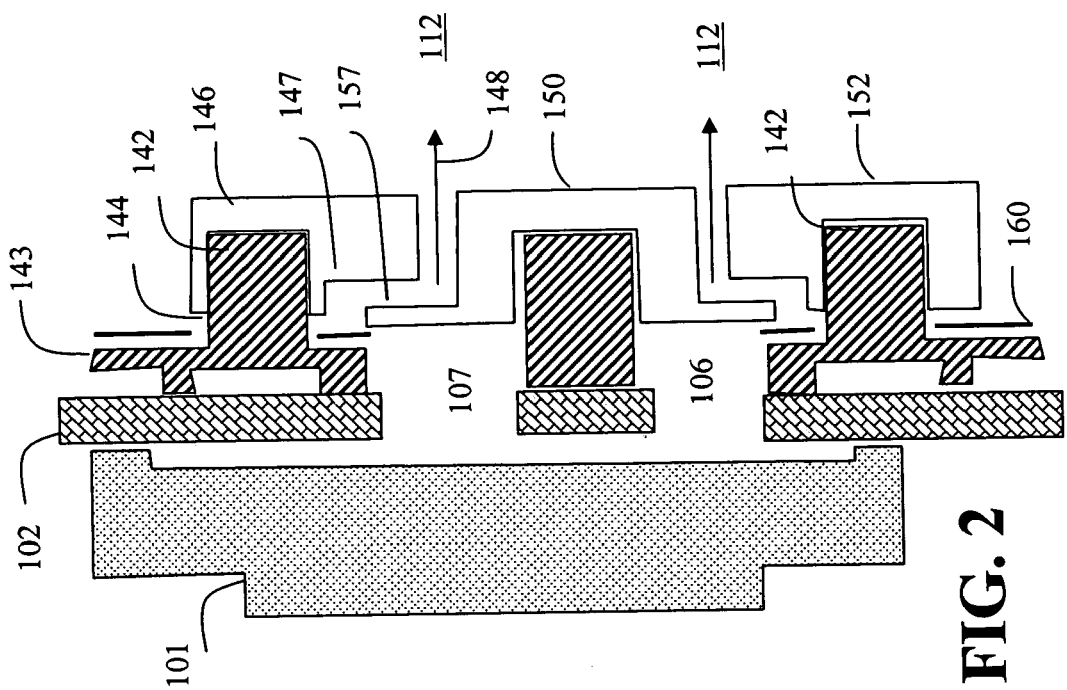
FIG. 2 is a side view of a transducer high audio porting design in accordance with the present invention.

Referring to FIG. 2, a cross section of an embodiment of the present transducer stacking design 120 illustrates the flanged keypad and transducer arrangement. The transducer stacking design 120 can include a transducer 101, a circuit board 102, and a membrane 143 with keys 144. The membrane 143 and keys 144 can be together considered the keypad 142, and the membrane 143 can be flexible. The keypad 142 can include keycaps 146 affixed atop the keys 144, i.e. key-posts. Audio ports 106 and 107 can be included in the transducer design 120 for providing a frontal volume area 107 anterior to the speaker 101 and posterior to the keypad 144. The audio ports allow sound to pass through the circuit board 102 and through the keypad 143. The keypad 142 can include a membrane (143) for supporting at least one key 150 with a flange 157, and at least one audio port 107 opening in said membrane for providing a passage of air from the transducer 101 positioned behind the keypad 143 through the flanged keys to a main volume area 112. The term 'key' can also refer to the 'keycap' that is used interchangeably.

For example, at least one flange 147 of a first key 146 interconnects with a second key 150 to obscure view of at least one audio port 107. With reference to FIG. 2, the flanges 147 and 157, of keys 146 and 150, respectively, prevent direct view of the audio port 107. Accordingly, the acoustic sound wave 148 from the transducer 101 may travel in between the flanges 147 and 157 to reach the main volume area 112. The keys can be flanged and overlapped to create an audio channel for the passage of sound from the frontal volume area 107 to the main volume area 112. The keys can be flanged with a spacing that is at least the depth of a key depression. For example, a spacing can be provided such that the flange from the pushing of a first key does not influence the flange of a second key. For example, depressing the upper key 146 causes the flanged overhang 147 to approach the flanged under-hang 157 of key 150. The flanged overhang 147 is initially spaced far apart from the flanged under-hang 157 such that the flanges do not exert force on one another during the depressing of a key.

In one arrangement, at least two keys can also be arranged with zero-gap distances between them, referred to as zero-gap keys. The zero-gap key can include a key post 144 and a keycap 146. For example, the key-post 144 can be a continuous part of the membrane 143, and the keycap 146 is a separate component affixed atop and overhanging the key 144. The zero-gap keys can be flanged to obscure view of the audio port 107, where the flange is part of the keycap and made of the same material and which extends in a plane horizontal and radial to the key.

Figure 5:
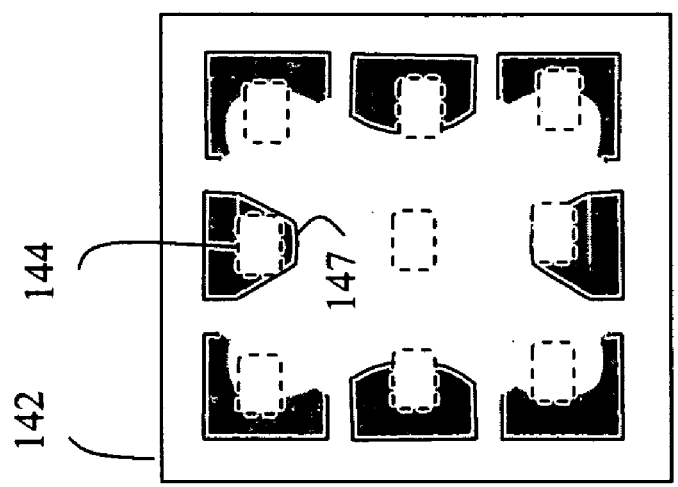
FIG. 5 is a top view of the flanged keypad showing the membrane supporting the flanged keys in accordance with the present invention.
Figure 4:
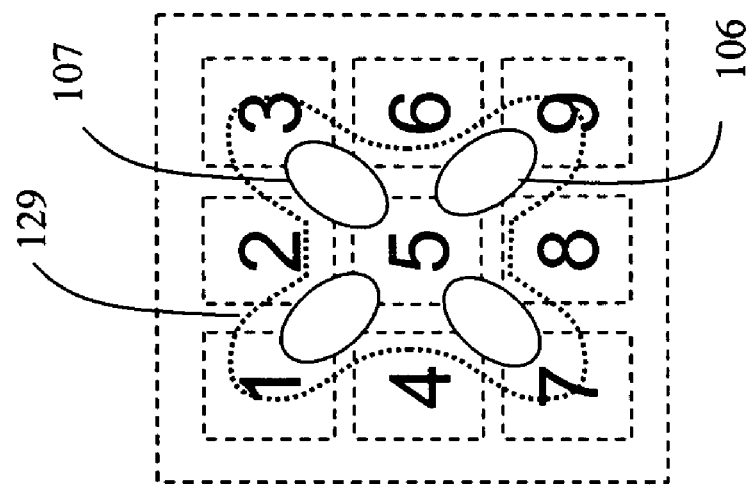
FIG. 4 is a top view of the flanged keypad showing the high audio port openings in accordance with the present invention.
Figure 3:
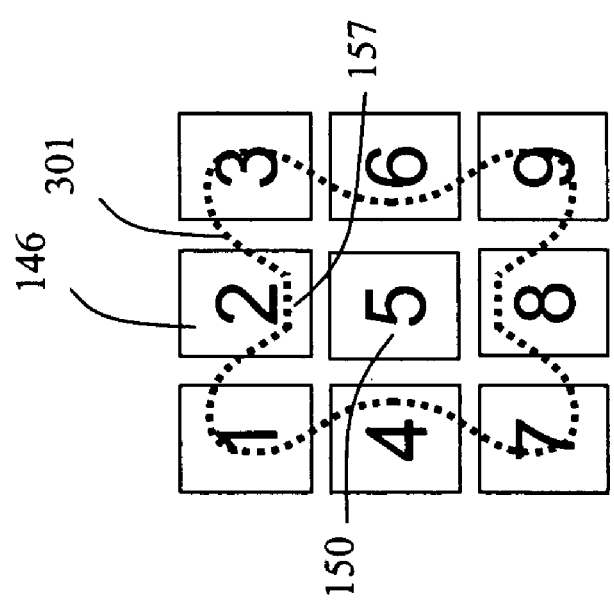
FIG. 3 is a top view of the flanged keypad showing the keys in accordance with the present invention.

For example, referring to FIG. 3, a top view of the flanged keypad shows the keys as seen from a user's perspective. The flanged keypad 300 can include at least one center zero-gap key 150 having a clover shaped flange 301 positioned at a center region on the keypad 300. The clover shaped flange 301 can be part of the center zero-gap key 150 and made of the same material. For instance, key '5' can be a keycap with a clover shaped flange. Each of the clover shaped petals covers at least one audio port opening. For example, referring to FIGS. 3 and 4, the flanged keypad 400 can have four audio port openings (107 and 106) which are covered by the clover shaped flange 301 shown by the dotted clover shape 129 in FIG. 4. The clover shaped flange 301 has under-hang flanges 157 interconnected with other keys having overhang flanges. For example, referring to FIGS. 3 through 5, the eight keys adjacent to the center zero-gap clover shaped flange key 150 each have flange over-hangs. The keys surrounding the center zero-gap key 150 on the keypad 104 have a flanged overhang described by the shape of the keys in illustration 500. The keys can be shaped in accordance with the illustration 500 to provide a flanged under-hang. The keys are supported by a key post of the underlying keypad membrane 144. The flanged overhang of each adjoining key interconnects with the flanged under-hang of the clover shaped zero-gap center key 150. In illustration 500, the flanged overhangs can be part of the keys and made of the same material. For illustration, the flanged overhang 147 of FIG. 5 corresponds to the flanged overhang 147 of FIG. 2. Accordingly, the flanged under-hang 157 of FIG. 3 for the clover shaped zero-center key corresponds with the flanged under-hang 157 of FIG. 2. Referring back to FIG. 5, the eight zero-gap keys can have flanged overhands positioned circumferential to the center zero-gap key for interconnecting with center zero-gap clover shaped flange 301. The clover shaped flange 301 can provide a passage of air from a transducer positioned behind the keypad 300 to a front region, and the interconnecting flanges can obscure the view of the audio ports 400.

Referring back to FIG. 2, the keypad 142 can further include a flexible material paper 160 covering the membrane 143 of the keypad between keys and extending up to the key-post and under said key-cap overhang. The membrane 160 can be composed of a material for channeling light to illuminate the key-cap 150, where the flexible material paper prevents light from leaking from under the flanged portion 157. The flanged keys can block light from the keypad 144 to the user. For example, lighted keypads are helpful for night time dialing. The keypad can be composed of a translucent material that sufficiently propagates light. The key-posts of the keys can pass light up through the keys for visualization by a user. The flanged keys prevent light from escaping between the keys thereby channeling light through the key-posts 144. The keys caps 146 can include translucent text just above the key-posts 144 for providing lighted dialing. The flanges on the keys can be non-translucent thereby minimizing the amount of light escaping between the keys.

In light of the foregoing description of the invention, it should be recognized that the present invention can be realized in various embodiments. Additionally, the description above is intended by way of example only and is not intended to limit the present invention in any way, except as set forth in the following claims.

What is claimed is:

1. A keypad for an electronic device or a communication device, comprising: a membrane for supporting at least one key; at least one key with at least a flange, wherein at least a portion of the flange of a first key overlaps with a second key in an overlapping region; and at least one audio port opening in said membrane for providing a passage of air from a transducer positioned behind said at least one key through said keypad, wherein said audio port opening is in a region of the membrane between said keys, and said overlapping obscures view of said at least one audio port opening in said membrane and wherein at least two keys are arranged with zero-gap distances between at least two keys forming a zero-gap keypad.

2. The keypad of claim 1, wherein at least one flange of a first key overlaps with at least one flanged portion of a second key to obscure view of said at least one audio port opening in said membrane.

3. The keypad of claim 1, wherein a space between the overlapping regions creates an audio channel for the passage of sound from said transducer.

4. The keypad of claim 3, wherein said spacing between a first flange of the first key and said second flange of the second key is at least equal to the depression depth of said first key, wherein said spacing prevents the first flange from exerting force on the second flange during a key depression.

5. The keypad of claim 1, wherein at least one key overlaps at least one flange overlap to create an audio channel for the passage of sound from said transducer.

6. The keypad of claim 1, wherein the zero-gap keypad can further include a key post and a keycap, wherein the key-post is a continuous part of the membrane and the keycap is a separate component affixed atop and overhanging the key-post.

7. The keypad of claim 6, wherein said flange is part of said keycap and made of the same material, the flange extending in a plane orthogonal and radial to said key-post.

8. The keypad of claim 6, wherein said flange of said at least one key covers at least one audio port opening.

9. The keypad of claim 6, further comprising a flexible material covering said membrane between keys.

10. The keypad of claim 9, wherein said membrane of at least one key-post is comprised of a translucent material for channeling light to illuminate said key-cap, wherein the flexible material prevents light from leaking from under a flanged portion.

11. A zero-gap keypad design for an electronic device or a communication device, comprising:

a membrane for supporting at least one zero-gap key;

at least one center zero-gap key positioned at a center region on said membrane, at least one zero-gap key having flanged overhands positioned circumferential to said center zero-gap for overlapping with said center zero-gap key; and at least one audio port opening in said membrane for providing a passage of air from a transducer positioned behind the overlapping zero-gap keys through the zero-gap keypad to a front region, wherein said overlapping zero-gap keys obscures view of said at least one audio port opening.

12. The zero-gap keypad design of claim 11, wherein the said center zero-gap key has a clover shaped flange underhang with eight zero-gap keys each with an over-hang flange are placed circumferential to said center zero-gap key for overlapping said clover shaped flange under-hang with said eight over-hang flanges.

13. A transducer stacking design for an electronic device or a communication device; comprising a transducer assembly; a circuit board having at least one audio port; and a keypad with at least one flanged key providing a pathway for the passage of a sound from said transducer to a main volume area, wherein said keypad overlays said circuit board which partially encloses said transducer; wherein said keypad further includes a membrane for supporting at least one zero-gap key; at least one zero-gap key with a flange, wherein at least one flange of a first key overlaps with at least one flange of a second key forming an overlapping region; and at least one audio port opening in said membrane for providing a passage of air from a transducer positioned behind the keypad through the zero-gap key and membrane to a front region, wherein said audio port opening is in a region of the membrane between said zero-gap keys, and said overlapping region of said first flange and said second flange obscures view of said at least one audio port opening.

14. The transducer stacking design of claim 13, wherein said at least one flanged key covers at least one audio port opening.

15. The transducer stacking design of claim 13, wherein said at least one flanged key obscures view of at least one audio port opening.

16. The transducer stacking design of claim 13, wherein said transducer assembly supports a frontal and a rear transducer arrangement.

17. The transducer stacking design of claim 13, further comprising a flexible opaque material covering said membrane for channeling light to illuminate said zero-gap keys, wherein the flexible material prevents light from leaking from under a flanged portion.

18. The transducer stacking design of claim 13, wherein the transducer stacking design resides within a portable electronic product that is selected from the group comprising a portable two-way radio, a cellular phone, a laptop computer, a cordless phone, a personal digital assistant, and a portable radio receiver.

* * * * *